June 1, 1954  C. S. BUSQUE  2,679,701
LAND CLEARING ATTACHMENT FOR TRACTORS
Filed Jan. 8, 1952  3 Sheets-Sheet 1

Inventor
Charles S. Busque

Attorneys

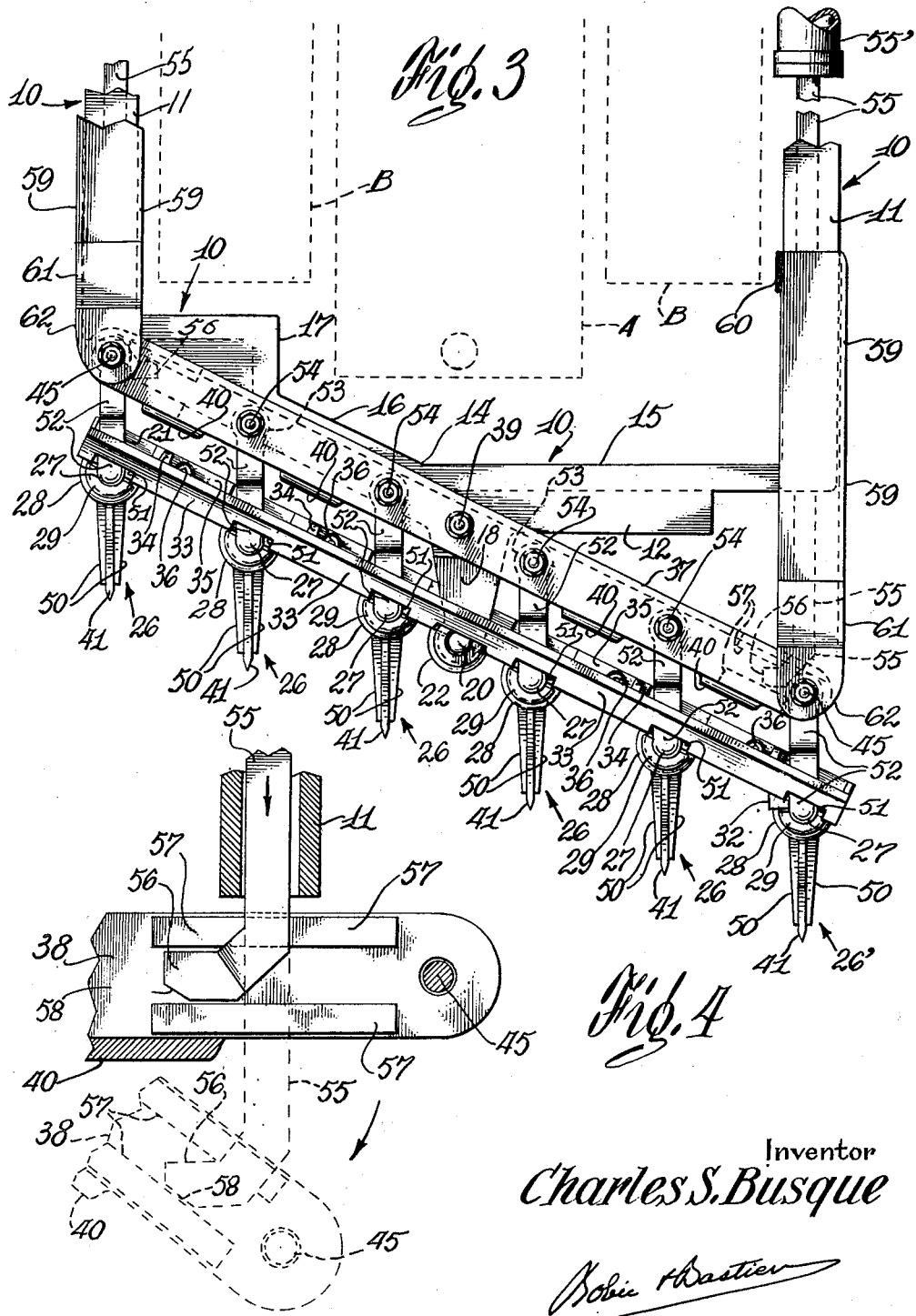

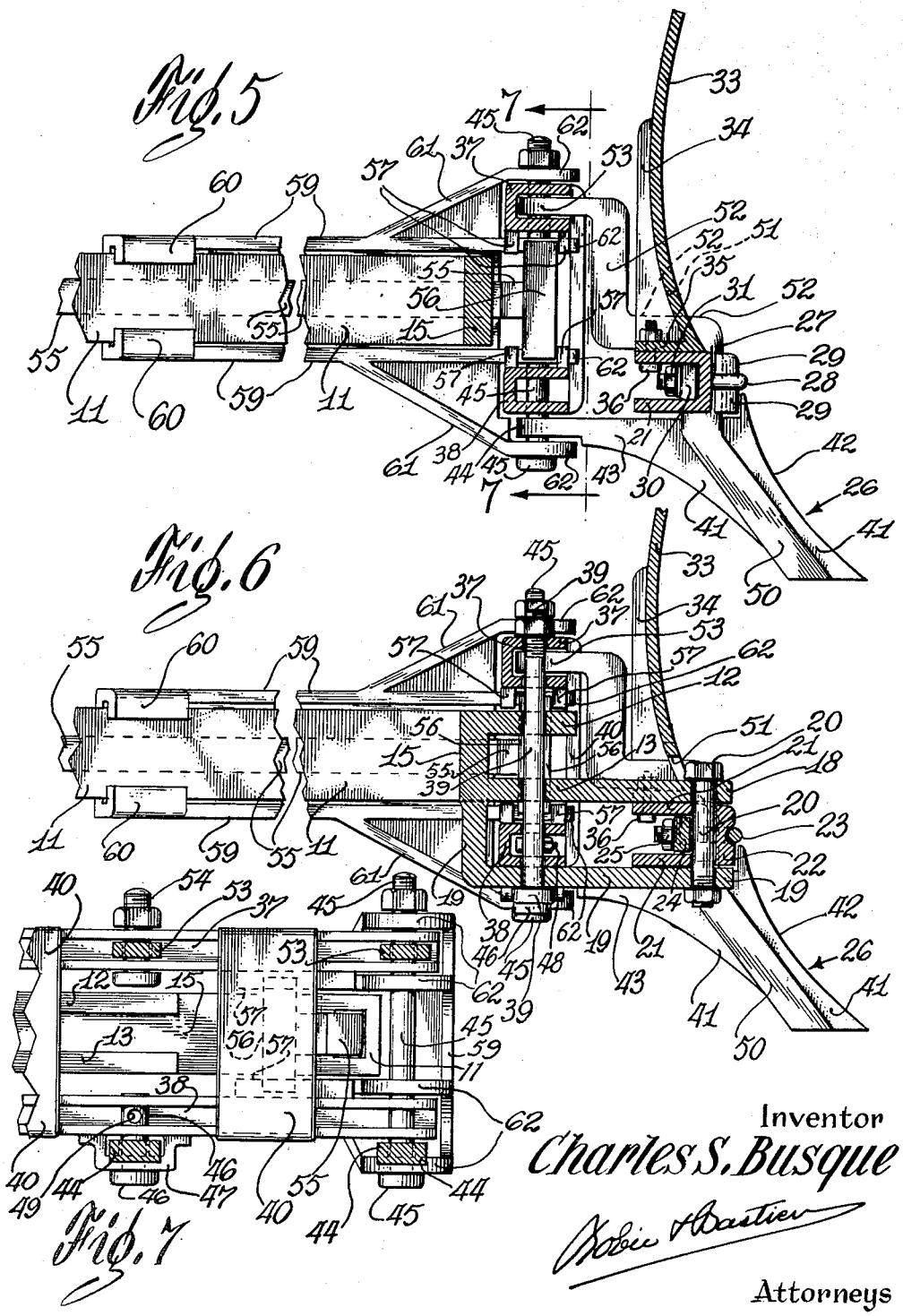

Patented June 1, 1954

2,679,701

UNITED STATES PATENT OFFICE 2,679,701

LAND CLEARING ATTACHMENT FOR TRACTORS

Charles S. Busque, St. Robert, Quebec, Canada

Application January 8, 1952, Serial No. 265,491

4 Claims. (Cl. 37—2)

The present invention relates to tractor attachments and more particularly to an attachment for clearing land of stumps, boulders and the like.

The general object of the present invention is the provision of improved means for more efficiently clearing land by power vehicles such as tractors.

The main object of the present invention is the provision of a land clearing attachment for tractors having a plurality of ground engaging teeth, said attachment so constructed that said teeth may engage the ground along a line extending substantially perpendicular to the direction of movement of the tractor or along a line inclined relatively to said direction.

Still another important object of the present invention is the provision of a land clearing attachment having a plurality of aligned forwardly projecting ground engaging teeth, said attachment adapted to dispose said teeth transversely of said tractor or at an angle relatively thereto, said teeth adapted to remain in their original forwardly pointing direction when in their last mentioned position.

Another important object of the present invention is the provision of a land clearing attachment of the character described which may be used indifferently to push the debris cleared from the land in front of the tractor to any convenient location or to discharge said debris alongside the tractor as the latter moves along.

Yet another important object of the present invention is an attachment of the character described which is pivotally mounted on the tractor for vertical movement in front of the tractor.

Another important object of the present invention is the provision of a land clearing attachment for tractors provided with a plurality of ground engaging teeth in which the transverse distance between said teeth may be varied according to the type of ground being cleared.

A further object concerns an attachment of the character described which is adapted to operate efficiently with a minimum of power expenditure.

Yet another important object of the present invention is the provision of an attachment of the type referred to which is relatively inexpensive to manufacture and which is strong and durable.

Yet another important object of the present invention is the provision of a land clearing attachment in which all the constituting parts may be easily replaced if broken.

The foregoing and other important objects will become more apparent during the following disclosure and by referring to the drawings in which:

Figure 3 is a plan view similar to that of Figure 2 but showing the teeth disposed obliquely to the longitudinal axis of the tractor;

Figure 4 is an enlarged fractional plan section showing the connection of a pusher bar with one end of a transverse beam pivotally mounted on the frame of the attachment;

Figure 5 is a cross-sectional elevation along line 5—5 of Figure 2;

Figure 6 is a cross-sectional elevation along line 6—6 of Figure 2; and

Figure 7 is a longitudinal fractional section along line 7—7 of Figure 2.

Figures 1, 2:
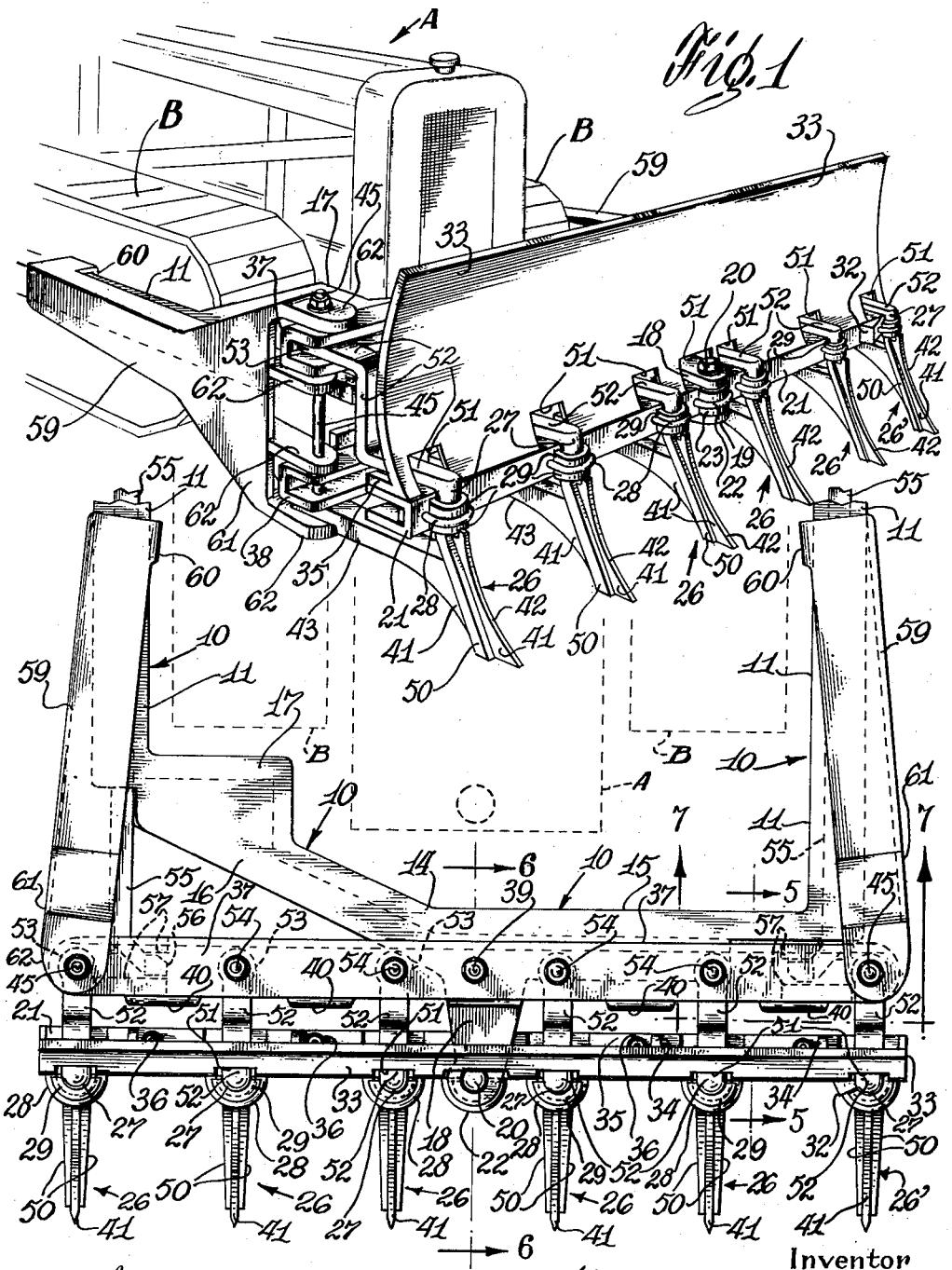
Figure 1 is a perspective view of the land clearing attachment shown mounted in front of a tractor.
Figure 2 is a plan view of the land clearing attachment showing the tractor in dotted line, the teeth of the attachment being shown aligned transversely of the tractor.

Referring now more particularly to the drawings in which like reference characters indicate like elements throughout, a rigid frame 10, having generally a U shape when viewed in plan, is pivotally secured for vertical movement to a tractor generally indicated by the reference letter A, said tractor having endless tracks B. The frame 10 is preferably secured at the sides of the tractor at the rear end thereof and suitable power means not shown are provided to move the same up or down.

The frame 10 consists more particularly in two straight hollow legs 11 of rectangular cross-section and joined by a transverse section which is preferably in the form of a channel, its horizontally extending top and bottom flanges 12 and 13 projecting forwardly from the tractor A.

The transverse section is bent at 14 near the middle thereof to form a straight portion 15 extending at right angles to the legs 11 and a rearwardly inclined portion 16 preferably provided with a rearwardly extending right-angle projection 17 engaging the space defined by the front end of one endless track B and the front end of the tractor A. This projection 17 further reinforces the inclined portion 16 of the frame 10.

As shown in Figures 2, 3 and 6, the lower horizontal flange 13 of the frame 10 forms near the bend 14 a horizontal forwardly projecting extension 18 aligned with the longitudinal axis of the tractor A.

An L-shaped plate 19 extends underneath the extension 18, its short leg rigidly secured to the rear edge of the flange 13 and its long leg extending in spaced parallel relationship with said extension 18.

A bolt 20 is mounted vertically at the free end of the extension 18 and L-shaped member 19. A horizontally extending straight channel beam 21 is pivotally mounted at its middle on the bolt 20 between the extension 18 and L-shaped member 19 as shown in Figure 6. The bolt 20 is received in a suitable groove made in the web portion of said beam 21 and is secured to the latter by means of a U-shaped clamp member 22 surrounding a collar 23 which is in contact with the pin 20, and having its free ends passing through the web of the beam 21 and through a spacer block 24 disposed within the beam 21. Nuts 25 threadedly engaging the free ends of the U-shaped clamp member 23, secure the latter in position. Thus it is seen that the beam 21 is pivotally mounted at its middle portion on the bolt 20 and may take a position transverse of the longitudinal axis of the tractor as shown in Figure 2 or inclined relatively thereto as shown in Figure 3.

A plurality of equally spaced, forwardly projecting ground engaging teeth 26 are pivotally mounted on the forward beam 21 in a manner similar to the pivotal mounting of said beam on the bolt 20. The teeth 26 have a vertically extending rod-like portion 27 engaging equally spaced grooves made in the web portion of the channel beam 21 and secured in place by means of a U-shaped clamp 28 surrounding the collar 29 and extending through a spacer block 30 disposed within the channel beam 21. The clamp member 28 is secured by means of nuts 31. All the teeth 26 are pivotally mounted on the channel beam 21 in a similar manner, except the end tooth 26' which is disposed foremost when the land clearing attachment is in inclined position as shown in Figure 3. In order to further reinforce the pivotal mounting of said tooth 26', a wedge 32 is inserted between the beam 21 and the collar 29.

An upright concave heavy pusher plate 33 provided at its rear face with vertical reinforcements 34 and bent at its lower edge to form a rearward horizontal flange 35, is secured to the top of the beam 21 by means of bolts and nuts 36.

Two elongated straight horizontally extending top and bottom channel beams 37 and 38 respectively are pivotally mounted in superposed relationship at their middle portion above and underneath the transverse section of the rigid frame 10 by means of a bolt 39 vertically extending through the extending horizontal flanges of said channel beams 37 and 38, through the horizontal flanges 11 and 12 of the transverse frame portion 15 and through the long leg of the L-shaped member 19 disposed underneath the extension 18.

The bolt 39 is disposed directly behind the bolt 20, in line with the longitudinal axis of the tractor A. The two channel beams 37, 38 are further secured together to form a rigid unit by a plurality of spaced vertical plates 40 secured to the free edges of the horizontal flanges of said channel beams.

Thus it is seen that the top and bottom channel beams 37, 38 may pivot as a unit about the central bolt 39 secured to the frame 10.

The teeth 26 are preferably made in two separate parts welded together; namely, a vertically extending plate-like member 41 having a concave forward edge 42 to engage the ground and a rearward extension 43 having an end ear 44 disposed under the lower channel beam 38 to be pivotally secured thereto by means of a through bolt 45, such as shown in Figure 5, for the end teeth of the attachment, or by means of a short pin 46 such as shown in Figure 7 for the intermediate teeth of the attachment. In the latter case the ears 44 of the teeth 26 engage a yoke 47 secured underneath the lower flange of the bottom channel beam 38. The short pins 46, which pass through the yoke 47 and the flanges of the lower beam 38, are maintained in place by means of a small set screw 48 shown in Figure 6 threadedly engaging a hole 49, shown in Figure 7, between the two horizontal flanges of the lower channel beam 38.

The other constituting part of the teeth 26 comprises the vertically extending rod-like portion 27, previously described, which is forked at its lower end to form two prongs 50 extending on both sides of the plate 41 and welded or otherwise secured thereto. The upper end of the rod-like portion 27 is bent rearwardly at right-angles to pass through suitable notches 51 made in the concave pusher plate 33 and form Z-shape extension 52, the horizontally extending free end of which forms ears 53 engaging the top channel beam 37 to be pivotally secured thereto by means of the through bolts 45 for the end teeth of the attachment or by means of short bolts 54, shown in Figure 7, for the intermediate teeth.

It is seen from the above description that the channel beams 21, 37 and 38, and the teeth 26 constitute a deformable parallelogram arrangement pivotally mounted on the frame 10 for horizontal movement such that said parallelogram may take a position extending transversely of the tractor as shown in Figure 2, or extending at an angle or obliquely thereto as shown in Figure 3, the teeth 26 remaining all the time in planes parallel to the longitudinal axis of the tractor e. g. pointed forwardly. It will be noted that the pivotal connections of the teeth 26 to the rear channel beams 37, 38 are all aligned with the pivotal connection 39 of said channel members to the frame 10 and that the pivotal connection of the teeth 26 to the forward beam 21 are all aligned with the pivotal connection of said forward channel member 21 to the extension 18 of the frame 10 so as to ensure good working of the parallelogram arrangement.

In order to pivot the parallelogram arrangement about bolts 39 and 20 there are provided two pusher bars 55 slidably extending within the legs 11 of the rigid frame 10 and connected at their rear end to suitable power means, such as the hydraulic unit 55' shown in Figure 3, mounted on the tractor for imparting to said pusher bars 55 a reciprocal movement within the legs 11.

The front end 56 of the pusher bars 55 is bent inwardly at right angles and forms a T-shaped portion slidably engaging two pairs of guide rails 57 longitudinally secured, respectively, to the bottom face of the top beam 37 and to the upper face of the bottom beam 38 as shown in Figures 5 and 6. The front end corner of the T-shaped end portion 56 is bevelled as shown at 58 to come into flat contact with the forward guide rails 57 when the attachment is in inclined position relatively to the tractor. This is shown in dotted lines in Figure 4.

In order to further reinforce the attachment, according to the invention, and more particularly to prevent rocking of the channel beams 37, 38 and 21 in a vertical plane about their respective pivot on the frame 10, two guiding beams 59 having a channel cross-section, slidably enclose the legs 11 of the rigid frame 10. Their rear end is provided with inwardly bent flaps 60 to prevent said guiding beams 59 from disengaging the legs 11 and the forward end of said guiding beams is flared to form a portion 61 of relatively large width terminated by four spaced ears 62 pivotally mounted on the end bolts 45 to which are pivotally secured the end teeth 26 and the ends of the beams 37 and 48. Upon pivotal movement of the deformable parallelogram, the guide beams 59 will slide along the legs 11 while effecting slight transversal movement about their rear end.

While a preferred embodiment according to the invention has been illustrated and described it is understood that various modifications may be resorted to without departing from the spirit and scope of the appended claims.

I claim:

1. An attachment of the character described for a tractor comprising a rigid U-shaped frame having its legs pivotally mounted at the rear of said tractor for vertical arcuate movement and having its middle section extending transversely in front of said tractor, an integral extension projecting forwardly from said middle section, an elongated straight beam member pivotally mounted at its middle portion on the free end of said extension, a pair of superposed beam members pivotally mounted at their middle portion on the middle portion of said frame section of said rigid frame directly behind the pivotal connection of said first beam member, said superposed beam members extending respectively above and underneath said frame section, a plurality of equally spaced forwardly projecting teeth pivotally mounted on said first beam member and having rearwardly extending top and bottom extensions respectively pivotally connected to said pair of superposed beam members, and power operated means to pivot said beam members on said frame from a position transversely of said tractor to a position inclined relatively thereto.

2. An attachment of the character described for tractors as claimed in claim 1 wherein said pivoting means comprise pusher bars slidably mounted within the legs of said U-shaped rigid frame and operatively connected at their forward end to said pair of superposed beam members, and power means on said U-shaped frame for actuating said pusher bars.

3. An attachment as claimed in claim 1 further including a transverse pusher blade rigidly secured to said first named beam member and extending above the same.

4. An attachment as claimed in claim 1 including guide beams slidably mounted on the legs of said U-shaped frame and pivotally connected at their forward end to the ends of said pair of superposed beam members.

References Cited in the file of this patent

UNITED STATES PATENTS

| Number | Name | Date |
| --- | --- | --- |
| 1,061,649 | Wick | May 13, 1913 |
| 2,075,482 | Thorpe | Mar. 30, 1937 |
| 2,160,595 | LeBleu | May 30, 1939 |
| 2,179,583 | Wilson | Nov. 14, 1939 |
| 2,402,352 | Taylor | June 18, 1946 |
| 2,420,027 | Austin | May 6, 1947 |